(12) United States Patent
Kubota et al.

(10) Patent No.: US 9,039,962 B2
(45) Date of Patent: May 26, 2015

(54) STEEL FOR INDUCTION HARDENING, ROUGHLY SHAPED MATERIAL FOR INDUCTION HARDENING, PRODUCING METHOD THEREOF, AND INDUCTION HARDENING STEEL PART

(75) Inventors: Manabu Kubota, Tokyo (JP); Toshiharu Aiso, Tokyo (JP); Kei Miyanishi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 193 days.

(21) Appl. No.: 13/637,414

(22) PCT Filed: Feb. 15, 2011

(86) PCT No.: PCT/JP2011/053109
§ 371 (c)(1),
(2), (4) Date: Sep. 26, 2012

(87) PCT Pub. No.: WO2011/122134
PCT Pub. Date: Oct. 6, 2011

(65) Prior Publication Data
US 2013/0025747 A1    Jan. 31, 2013

(30) Foreign Application Priority Data

Mar. 30, 2010 (JP) ................. 2010-078232

(51) Int. Cl.
| | | |
|---|---|---|
| *C22C 38/08* | (2006.01) | |
| *C21D 9/32* | (2006.01) | |
| *C21D 1/18* | (2006.01) | |
| *C21D 1/42* | (2006.01) | |
| *C21D 9/30* | (2006.01) | |
| *C21D 9/40* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/18* | (2006.01) | |
| *C22C 38/60* | (2006.01) | |
| *C22C 38/12* | (2006.01) | |
| *C22C 38/14* | (2006.01) | |
| *C22C 38/16* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |

(52) U.S. Cl.
CPC .. *C21D 9/32* (2013.01); *C21D 1/18* (2013.01); *C21D 1/42* (2013.01); *C21D 9/30* (2013.01); *C21D 9/40* (2013.01); *C21D 2211/004* (2013.01); *C21D 2211/009* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/60* (2013.01); *C22C 38/08* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01)

(58) Field of Classification Search
None
See application file for complete search history.

(56) References Cited

U.S. PATENT DOCUMENTS

| | | | | |
|---|---|---|---|---|
| 5,478,523 A | * | 12/1995 | Brusso et al. ................... | 420/99 |
| 5,648,044 A | * | 7/1997 | Hoshino et al. ................. | 420/99 |
| 2009/0311125 A1 | * | 12/2009 | Miyanishi et al. .............. | 420/83 |
| 2011/0002807 A1 | | 1/2011 | Saitoh et al. | |

FOREIGN PATENT DOCUMENTS

| | | |
|---|---|---|
| CN | 101542004 | 9/2009 |
| CN | 101652494 | 2/2010 |
| JP | 62-112727 | 5/1987 |
| JP | 05-271868 | 10/1993 |
| JP | 07-118791 | 5/1995 |
| JP | 08-073929 | 3/1996 |
| JP | 09-041085 | 2/1997 |
| JP | 09-241798 | 9/1997 |
| JP | 09-291337 | 11/1997 |
| JP | 10-017928 | 1/1998 |
| JP | 10-017935 | 1/1998 |
| JP | 10-183296 | 7/1998 |
| JP | 10-183297 | 7/1998 |
| JP | 10-219348 | 8/1998 |
| JP | 10-219392 | 8/1998 |
| JP | 11-001749 | 1/1999 |
| JP | 11-131135 | 5/1999 |
| JP | 11-131176 | 5/1999 |
| JP | 11-269601 | 10/1999 |
| JP | 11-350066 | 12/1999 |

(Continued)

OTHER PUBLICATIONS

Machine-English translation of Japanese patent No. 09-078183, Watari Koji et al., Mar. 25, 1997.*

(Continued)

Primary Examiner — Deborah Yee
(74) Attorney, Agent, or Firm — Kenyon & Kenyon LLP

(57) ABSTRACT

A steel for an induction hardening including, by mass %, C: more than 0.75% to 1.20%, Si: 0.002 to 3.00%, Mn: 0.20 to 2.00%, S: 0.002 to 0.100%, Al: more than 0.050% to 3.00%, P: limited to 0.050% or less, N: limited to 0.0200% or less, O: limited to: 0.0030% or less, and the balance composing of iron and unavoidable impurities, wherein an Al content and a N content satisfy, by mass %, Al−(27/14)×N>0.050%.

11 Claims, No Drawings

(56) References Cited

FOREIGN PATENT DOCUMENTS

| | | |
|---|---|---|
| JP | 2000-144307 | 5/2000 |
| JP | 2000-319725 | 11/2000 |
| JP | 3208960 | 9/2001 |
| JP | 3239432 | 12/2001 |
| JP | 2002-053930 | 2/2002 |
| JP | 3428282 | 7/2003 |
| JP | 3458604 | 10/2003 |
| JP | 3503289 | 3/2004 |
| JP | 3550886 | 8/2004 |
| JP | 3562192 | 9/2004 |
| JP | 2004-285474 | 10/2004 |
| JP | 2004-292945 | 10/2004 |
| JP | 2004-300551 | 10/2004 |
| JP | 2005-002366 | 1/2005 |
| JP | 3606024 | 1/2005 |
| JP | 3607583 | 1/2005 |
| JP | 3644217 | 4/2005 |
| JP | 2005-163173 | 6/2005 |
| JP | 2006-028599 | 2/2006 |
| JP | 3823413 | 9/2006 |
| JP | 2007-204796 | 8/2007 |
| JP | 2008-248282 | 10/2008 |
| JP | 2009-102733 | 5/2009 |
| JP | 2009-127091 | 6/2009 |
| JP | 4390526 | 12/2009 |
| JP | 4390576 | 12/2009 |
| WO | 2010/082454 | 7/2010 |

OTHER PUBLICATIONS

Office Action dated Dec. 20, 2013 in corresponding Chinese Application No. 201180016607.3 [with English Translation].
Office Action dated Apr. 16, 2014 in Korean Application No. 10-2012-7025509 [with English Translation].
International Search Report dated May 24, 2011, issued in corresponding PCT Application No. PCT/JP2011/053109.
"Heat Treatment Technology", Japan Society for Heat Treatment in 2000, Nikkan Kogyo Shimbun Ltd., Tokyo, P569.

* cited by examiner

STEEL FOR INDUCTION HARDENING, ROUGHLY SHAPED MATERIAL FOR INDUCTION HARDENING, PRODUCING METHOD THEREOF, AND INDUCTION HARDENING STEEL PART

TECHNICAL FIELD

The present invention relates to a steel for induction hardening, a roughly shaped material for induction hardening, a producing method thereof, and an induction hardening steel part.

This application is a national stage application of International Application No. PCT/JP2011/053109, filed Feb. 15, 2011, which claims priority to Japanese Patent Application No. 2010-078232, filed Mar. 30, 2010, the content of which is incorporated herein by reference.

BACKGROUND ART

Most power transmission parts (for example, gears, bearings, CVT sheaves, shafts, and the like) used for automobiles, construction machines, farm machines, electricity generating-wind turbines, other industrial machines and the like are used after being subjected to a surface hardening treatment to improve, for example, fatigue characteristics and abrasion resistance of the parts. Among a plurality of known surface hardening treatments, a carburizing treatment is superior to other surface hardening treatments in terms of the surface hardness, depth of hardened layer, productivity, and the like, so the carburizing treatment is applied to numerous types of the parts. For example, in a manufacturing method of the gears and bearing parts, by using medium carbon alloy steel such as SCM 420, SCR 420, SNCM 220 in general, and the like specified by JIS, a mechanical processing is performed to obtain a predetermined shape through a hot forging, a cold forging, cutting, or through a combination thereof, and then the carburizing treatment or a carbonitriding treatment is performed. The fatigue fracture of the gears is classified roughly into bending fatigue (dedendum fatigue) and tooth surface fatigue (pitting or the like). In order for the gear parts to obtain durability, both the above types of fatigue strength need to be improved. Since the gears which are produced by the carburizing treatment have very high hardness of hardening layer, there is the feature of having the performance excellent in both the bending fatigue strength and the fatigue strength.

However, the carburizing treatment is batch processing in the gas atmosphere. For example, the carburizing treatment requires heating and holding around 930° C. for several hours or more, so that significant occupancy expense, treatment energy, and cost are needed. The carburizing treatment emits a large volume of $CO_2$, so that there is a problem in terms of the environment. Since the carburizing treatment is the batch processing, the carburizing treatment has the problems which are that the dispersion of part accuracy becomes possibly large because of the heat treatment deformation caused by the difference of the loading position of the parts at the carburizing treatment and that the accuracy control of the parts is difficult. In order to solve the problems concerned with the heat treatment deformation, huge effort has been made in regard to materials and operations, and then the improvement effect to a certain extent has been obtained. However, a radical method of settlement is still not found out, and it is said that the improvement effect does not reach enough levels.

In order to solve the problems, the research on application of induction hardening (electromagnetic induction hardening) treatment to substitute the carburizing treatment has been made. Since the induction hardening treatment can reduce considerably the energy and the time for the treatment compared with the carburizing treatment, the induction hardening treatment has the advantages of the productivity and the cost reduction. Furthermore, the induction hardening treatment does not emit a large volume of $CO_2$ and quenching oil to environment, so that there is the advantage for the environment. In addition, since the area which is affected by the influence of the heat treatment is limited to the surface unlike the carburizing treatment, the heat treatment deformation by the induction hardening treatment is essentially small. Moreover, there are the advantages which are that consecutive processing becomes possible because processing time is short and that the accuracy control of the parts becomes easy because the dispersion of the heat treatment deformation is small.

On the other hand, although there are the above mentioned advantages, the induction hardening treatment has not become common as the substitution of the carburizing treatment. The prime reasons thereof are because coexistence between the securement of tooth surface fatigue strength (pitching strength and the like) of the parts and workability (machinability or cold forgeability) during production of the parts is very difficult. Not only the gears but also CVT sheaves and bearings need to improve surface fatigue such as tooth surface fatigue and rolling fatigue. It is reported that hardness at 300° C. (or hardness after tempering at 300° C., hereinafter referred to as 300° C. tempered hardness) correlates strongly with the surface fatigue strength since surface temperature of the contact surface of the parts rises up to about 300° C. while using the parts. The 300° C. tempered hardness of martensite structure obtained by the carburizing treatment or the induction hardening treatment improves with an increase in carbon content in surface layer. Although the 300° C. tempered hardness is affected by addition of alloying elements, the influence of the carbon content is greater. An improvement effect of the 300° C. tempered hardness by the addition of the alloying elements increases with the increase in the carbon content. Therefore, in order to obtain the surface fatigue strength equivalent to carburized parts, it is necessary that the carbon content (about 0.80%) is equivalent to the carbon content in the surface layer of the carburized parts. However, the increase in the carbon content of the parts results in the increase in hardness of base steel, so that the workability (the machinability or the cold forgeability) of the parts deteriorates remarkably, which is not suitable for industrial production. It is indispensable to coexist between high carbon content of the base steel and securement of the workability.

For example, Patent Documents 1 to 6 suggest the technique of producing parts by performing the induction hardening to medium carbon steels (C: to 0.65%). However, since the carbon content is considerably less than that of the surface layer of the carburized parts, the workability does not deteriorate so much, but the tooth surface fatigue strength decreases compared with the carburized parts. For this reason, the technique cannot be substituted for the carburizing. For example, Patent Documents 7 to 13 suggest the technique of obtaining the parts in which the tooth surface fatigue strength is improved by performing the induction hardening to comparative high carbon steels (C: to 0.75%). However, since the carbon content is still less than that of the surface layer of the carburized parts, the tooth surface fatigue strength which is equal to that of the carburized parts is not obtained. Moreover, the workability decreases notably with the increase in the carbon content in the steels. However, since the improvement technique for this is insufficient, both the tooth surface fatigue strength and the workability are insufficient after all, so that the technique cannot be substituted for the carburizing.

For example, Patent Documents 14 to 17 suggest the technique which is to improve the workability and the like by providing suitable rolling conditions, forging conditions, and cooling conditions to comparative high carbon steels (C: to 0.75%). However, as described above, since the carbon content is still less than that of the surface layer of the carburized parts, the tooth surface fatigue strength which is equal to that of the carburized parts is not obtained, so that the technique cannot be substituted for the carburizing.

For example, Patent Documents 18 to 23 suggest the technique in which a heat treatment is performed if necessary and then the induction hardening is performed to the steels which have the high carbon composition which is equal to that of the surface layer of the carburized parts. By the technique, a hardening layer with the structure in which alloy carbides are dispersed in the martensite structure is formed, so that the parts which have the high tooth surface fatigue strength are obtained. However, in the technique, alloy addition such as Cr, V, Ti, Nb, and the like is large in order to disperse the alloy carbides. Thus, although the tooth surface fatigue strength which is greater than that of the carburized parts is obtained, the workability decreases notably by both the increase of the carbon content and the increase of the alloy addition. Therefore, except for application on some special parts, since the application and the practical realization for mass products are difficult in terms of the cost, the productivity, and the like, it cannot be said that the technique is practical to substitute for the carburizing.

For example, Patent Documents 24 to 26 suggest the technique in which the heat treatment is performed if necessary and then the induction hardening is performed to the steels which have the high carbon composition which is equal to that of the surface layer of the carburized parts, in order to obtain the parts in which the tooth surface fatigue strength is improved. However, since the improvement for the workability is insufficient, the technique also cannot be substituted for the carburizing.

For example, Patent Document 27 suggests the technique which is to improve the machinability by precipitating graphites to a certain extent by using the high carbon steels (C: 0.80 to 1.50%). Although the example of application to the induction hardening steel part is also shown in the patent documents 27, in the base steel in which a lot of the graphites are dispersed, it is difficult to solute the graphites as solid solution in matrix, and there is a problem such that voids are formed at the position where the graphites existed. For this reason, in the method, various characteristics for the power transmission parts which require reliability deteriorate. In order to perform solution of the graphites or dissolution of the voids, the induction hardening should be performed by the special conditions which are at a high temperature and for a long time. For this reason, problems which are that the control of depth of the hardening layer is impossible or the productivity deteriorates occur. In this case, the above mentioned advantageous feature of the induction hardening is not obtained at all. Therefore, it cannot be said that the technique of dispersing a lot of graphites is practical to apply to the induction hardening treatment of the power transmission parts.

CITATION LIST

Patent Document

[Patent Document 1] Japanese Unexamined Patent Application, First Publication No. S62-112727

[Patent Document 2] Japanese Patent No. 3239432
[Patent Document 3] Japanese Unexamined Patent Application, First Publication No. H9-291337
[Patent Document 4] Japanese Unexamined Patent Application, First Publication No. 2000-319725
[Patent Document 5] Japanese Unexamined Patent Application, First Publication No. H11-269601
[Patent Document 6] Japanese Unexamined Patent Application, First Publication No. 2000-144307
[Patent Document 7] Japanese Unexamined Patent Application, First Publication No. H7-118791
[Patent Document 8] Japanese Unexamined Patent Application, First Publication No. H11-1749
[Patent Document 9] Japanese Patent No. 3208960
[Patent Document 10] Japanese Patent No. 3503289
[Patent Document 11] Japanese Patent No. 3428282
[Patent Document 12] Japanese Patent No. 3562192
[Patent Document 13] Japanese Patent No. 3823413
[Patent Document 14] Japanese Patent No. 3458604
[Patent Document 15] Japanese Patent No. 3550886
[Patent Document 16] Japanese Patent No. 3644217
[Patent Document 17] Japanese Patent No. 3606024
[Patent Document 18] Japanese Patent No. 3607583
[Patent Document 19] Japanese Unexamined Patent Application, First Publication No. 2002-53930
[Patent Document 20] Japanese Unexamined Patent Application, First Publication No. 2005-163173
[Patent Document 21] Japanese Patent No. 4390526
[Patent Document 22] Japanese Patent No. 4390576
[Patent Document 23] Japanese Unexamined Patent Application, First Publication No. 2009-102733
[Patent Document 24] Japanese Unexamined Patent Application, First Publication No. H8-73929
[Patent Document 25] Japanese Unexamined Patent Application, First Publication No. 2004-300551
[Patent Document 26] Japanese Unexamined Patent Application, First Publication No. 2008-248282
[Patent Document 27] Japanese Unexamined Patent Application, First Publication No. H11-350066

SUMMARY OF INVENTION

Technical Problem

In view of the above-mentioned problems, an object of the invention is to provide a steel for induction hardening, a roughly shaped material for the induction hardening, a producing method thereof, and an induction hardening steel part, in which fatigue strength (tooth surface fatigue strength, tooth root fatigue strength, and the like) of the steel part after the induction hardening is equal to or greater than that of carburized parts, and coexistence between securement of the fatigue strength of the steel part and workability during production of the part is possible.

Solution to Problem

Hereinafter the steel, which is cast in order to produce an induction hardening steel part and for which soaking, blooming, and the like are conducted if necessary, is referred to as a steel for induction hardening. The roughly shaped intermediate material, which is made by at least one process of warm forging, hot forging, hot rolling, slow cooling, annealing, and the like to the steel for the induction hardening, is referred to as a roughly shaped material for the induction hardening (or referred to as a base steel, or simply a roughly shaped material). An induction hardening steel part is produced by the induction hardening and other processes as necessary, following cutting, cold forging, and/or the like to the roughly shaped material.

In order to solve the above-mentioned problems, the inventors have investigated and then found the following results.

(a) The controlling factor of the strength of the high carbon base steel with carbon content of greater than 0.75% is the strength of a pearlite. Thus, by performing an annealing on suitable conditions when producing the roughly shaped material before cutting or cold forging, softening can be obtained by a decrease in the strength of the pearlite, so that machinability and cold forgeability can be improved.

(b) In case that the roughly shaped material is made by hot working, by performing a suitable cooling in cooling process after the hot working, softening can be obtained by a decrease in the strength of the pearlite.

(c) By not adding an alloying element excessively but increasing Al content considerably compared with conventional steel as a steel composition, a decrease in the machinability can be suppressed even if the strength of the roughly shaped material before cutting increases by an increase in the carbon content.

The inventors completed the present invention by utilizing suitably the above mentioned techniques. An aspect of the present invention employs the following.

(1) A steel for an induction hardening according to an aspect of the invention comprising, by mass %,
C: more than 0.75% to 1.20%,
Si: 0.002 to 3.00%,
Mn: 0.20 to 2.00%,
S: 0.002 to 0.100%,
Al: more than 0.050% to 3.00%,
P: limited to 0.050% or less,
N: limited to 0.0200% or less,
O: limited to 0.0030% or less, and
the balance consisting of iron and unavoidable impurities,
wherein an Al content and a N content satisfy, by mass %, Al−(27/14)×N>0.050%.

(2) The steel for the induction hardening according to (1) may further comprise, by mass %,
B: 0.0005 to 0.0050%.

(3) The steel for the induction hardening according to (1) or (2) may further comprise at least one of, by mass %,
Cr: 0.05% to less than 0.30%,
Mo: 0.01 to 1.00%,
Cu: 0.05 to 1.00%, and
Ni: 0.05 to 2.00%.

(4) The steel for the induction hardening according to any one of (1) to (3) may further comprise at least one of, by mass %,
V: 0.005 to less than 0.20%,
Nb: 0.005 to 0.10%, and
Ti: 0.005 to 0.10%.

(5) The steel for the induction hardening according to any one of (1) to (4) may further comprise at least one of, by mass %,
Ca: 0.0005 to 0.0030%,
Zr: 0.0005 to 0.0030, and
Mg: 0.0005 to 0.0030%.

(6) A roughly shaped material for the induction hardening which has a chemical composition of the steel for the induction hardening according to any one of (1) to (5),
wherein a number of graphite grains with an average grain size of 0.5 μm or more which is included in the roughly shaped material for the induction hardening is 40 pieces/mm² or less.

(7) A producing method of a roughly shaped material for the induction hardening,
wherein processes of warm working or hot working, cooling, and annealing are performed in order by using the steel for the induction hardening according to any one of (1) to (5), and
wherein the annealing is performed by a condition of an annealing temperature of 680 to 800° C. and an annealing time of 10 to 360 minutes.

(8) The producing method of the roughly shaped material for the induction hardening according to (7),
wherein an average cooling rate in a temperature range of 750 to 650° C. during the cooling may be 300° C./hour or less.

(9) A producing method of a roughly shaped material for the induction hardening,
wherein processes of hot working and cooling are performed in order by using the steel for the induction hardening according to any one of (1) to (5), and
wherein an average cooling rate in a temperature range of 750 to 650° C. during the cooling is 300° C./hour or less.

(10) An induction hardening steel part which is produced by using the steel for the induction hardening according to any one of (1) to (5),
wherein a hardness of a hardened surface layer at a depth of 50 μm from a topmost surface of the induction hardening steel part is HV650 or more, a hardness of a non-induction hardening area is HV180 or more, and a number of graphite grains with an average grain size of 0.5 μm or more which exist in the non-induction hardening area is 40 pieces/mm² or less.

Advantageous Effects of Invention

According to the above aspects of the present invention in regard to the steel for the induction hardening, the roughly shaped material for the induction hardening, the producing method thereof, and the induction hardening steel part, the fatigue strength (the tooth surface fatigue strength, the tooth root fatigue strength, and the like) of the steel part after the induction hardening is equal to or greater than that of the carburized parts, and the workability during the production of the part is enhanced simultaneously. For the reason, it is possible to substitute the induction hardening treatment for the carburizing treatment. Thus, a continuous surface hardening treatment becomes possible, a load on the environment can be reduced, and the part accuracy can be improved. Therefore, the present invention contributes to the cost reduction, the environmental loading reduction, and the performance improvement for the automobiles and the like through the improvement of production method for the power transmission parts (for example, gears, bearings, shafts, CVT sheaves, and the like) of the automobiles and the like.

DESCRIPTION OF EMBODIMENTS

Through thorough research on various factors influencing the dispersive morphology of carbides in a carburized layer in a high carbon carburizing treatment, and through consideration of a method to obtain the fatigue strength which is equal to that of carburized steels for an induction hardening steel, the inventors have acquired the following knowledge.

(a) The 300° C. tempered hardness increases with an increase in carbon content of a roughly shaped material for the induction hardening, and the 300° C. tempered hardness which is equal to carburized parts is obtained by addition of C of more than 0.75%. Thus, a tooth surface fatigue strength which is equal to that of the carburized parts can be obtained even in the parts after the induction hardening.

(b) In case that the carbon content of the steel is more than 0.75%, structure of the roughly shaped material before machining and forming of the parts (cutting, cold forging) becomes mostly pearlite structure. Thus, the strength (related to a pearlite lamellar spacing) of the pearlite structure has dominant influence on the hardness of the roughly shaped material.

(c) By performing a suitable annealing in production process of the roughly shaped material before the machining and forming of the parts, fine pearlite lamellar can be changed and softening can be obtained, so that workability can be improved.

(d) On the other hand, in case that the roughly shaped material before the machining and forming of the parts is made by hot working, by performing a suitable cooling after the hot working, the pearlite lamellar spacing is broadened and softening can be obtained, so that the workability can be improved.

(e) By combination of the above (c) and (d), the roughly shaped material can be further softened, so that the workability can be further improved or an annealing time can be shortened.

(f) By securement of amount of solid soluted Al which is derived from an increase in Al content considerably compared with a conventional steel and simultaneously suppression of N content, tool life in the cutting can be prolonged drastically and machinability of the roughly shaped material can be improved. As to the conventional technique, the hardness of the roughly shaped material increases with the increase in the carbon content of the steel, so that the cutting cannot be performed. In contrast, according to the present invention, by the securement of the amount of solid soluted Al sufficiently, the cutting can be performed even if the hardness of the roughly shaped material increases, so that it is possible to increase the carbon content of the steel.

(g) Cr stabilizes θ carbide (cementite) by concentrating in the θ carbide, so that it is suppressed that the carbides dissolve into austenite during the induction hardening, which causes hardness unevenness of a hardening layer. Thus, in case that Cr is added, the addition is limited. In case that V, Nb, or Ti is added, excessive addition also causes the hardness unevenness of the hardening layer such as Cr, the hardness of the roughly shaped material increases, and the workability deteriorates, so that the addition is limited.

(h) Depending on the conditions of the annealing in producing the roughly shaped material by using the steel for the induction hardening, graphite grains may be formed in the roughly shaped material. If the graphite grains with a certain size or more and more than a certain quantity in the roughly shaped material exist when the cutting and/or cold working is conducted by using the roughly shaped material, the graphite grains do not dissolve sufficiently into the austenite during only short-time heating of the induction hardening, which causes the hardness unevenness of the hardening layer. Moreover, even if the graphite grains dissolve into the austenite, voids remain at the position where the graphite grains existed, so that the property of the parts may deteriorate. For these reasons, it is necessary to limit an amount of precipitation of the graphite in the roughly shaped material.

Hereinafter, the present invention will be described in detail. First, reasons for limiting the chemical composition of the steel for the induction hardening according to an aspect of the present invention will be described. The content % of the components means % by mass.

C: more than 0.75% to 1.20%

Carbon (C) is added to secure the surface hardness after the induction hardening and to secure the hardness of the core of the part. In general, the carbon content at the surface of the carburized parts is approximately 0.80%. In order for the induction hardening steel part to obtain the tooth surface fatigue strength (the 300° C. tempered hardness) which is equal to that of the carburized parts, the carbon content of the steel for the induction hardening should be increased compared with the conventional case. Since the tooth surface fatigue strength which is equal to that of the carburized parts is not obtained when the addition is insufficient, the carbon content of more than 0.75% needs to be added. When C of more than 1.20% is added, the hardness of the roughly shaped material increases, so that the workability in performing the process such as cutting, forging, and the like of the parts deteriorates considerably. Therefore the carbon content needs to be in the range of more than 0.75% to 1.20%. The preferable range for the carbon content is 0.76 to 0.90%.

Si: 0.002 to 3.00%

Silicon (Si) suppresses the transition to relatively coarse the θ carbide from ε carbide which precipitates at tempering, and considerably increases the resistance to temper softening of the martensite steel tempered at a lower temperature, when Si is added to the high carbon steel. Thus the tooth surface fatigue strength of the steel increases. To obtain the effect, the Si content of 0.002% or more needs to be added to the steel for the induction hardening of the present invention. Although the effect is enhanced with an increase in the Si addition, when Si of more than 3.00% is added, the hardness of the roughly shaped material increases, so that the workability in performing the process such as cutting, forging, and the like of the parts deteriorates considerably. In addition, since Si stabilizes the ferrite, when Si of more than 3.00% is added, the ferrite remains at the induction hardening and the uniform austenite is not obtain. As a result, the uniform austenite is not obtain after the hardening. Therefore the Si content needs to be in the range of 0.002 to 3.00%. The preferable range for the Si content is 0.20% to 1.50%. Especially, when the amount of the graphite needs to be restricted, the Si content may be 0.50% or less.

Mn: 0.20 to 2.00%

Manganese (Mn) has an effect of improving the hardenability of steel, so that Mn is effective in obtaining the martensite structure during carburizing quenching. To obtain the effect, the Mn content of 0.20% or more needs to be added to the steel for the induction hardening of the present invention. On the other hand, when Mn of more than 2.00% is added, the hardness of the roughly shaped material increases, so that the workability in performing the process such as cutting, forging, and the like of the parts deteriorates considerably. Therefore the Mn content needs to be in the range of 0.20 to 2.00%. The preferable range for the Mn content is 0.30% to 1.00%.

S: 0.002 to 0.100%

Sulfur (S) forms MnS by bonding to Mn. As the S addition increases, S shows an effect of improving the machinability. To obtain the effect, the S content of 0.002% or more needs to be added to the steel for the induction hardening of the present invention. On the other hand, when S of more than 0.100% is added, MnS becomes a path for propagating fatigue cracks, so that the bending fatigue strength of the products such as the gear and the like decreases. Therefore the S content needs to be in the range of 0.002 to 0.100%. The preferable range for the S content is 0.010% to 0.050%.

Al: more than 0.050% to 3.00%

Aluminum (Al) has an effect of improving considerably the tool life in the cutting of the roughly shaped material in case that Al exists as a solid solution in the roughly shaped material. The effect is derived from that the solid soluted Al of the roughly shaped material reacts with oxygen during the cutting, the hard coat of $Al_2O_3$ is formed, and the coat suppresses wear of the tool. The solid soluted Al of the roughly shaped material reacts with oxygen in the air, oxygen in a cutting oil, or oxygen in the homo treatment film ($Fe_3O_4$) of a tool surface, and the coat of $Al_2O_3$ which protects the tool is formed. The homo treatment film is an iron oxidation film with a thickness of several μm, which is formed by a heat treatment in a steam which is also called as a steam treatment, in order for the tool to obtain a corrosion resistance and the like (reference: "heat treatment technology" which was written and edited by Japan Society for Heat Treatment in 2000, Nikkan Kogyo Shimbun Ltd., Tokyo, P 569). By the presence of the coat which protects the tool, the direct contact of a material to be cut (the roughly shaped material) and the tool is prevented, and the adhesive wear of the tool is suppressed. In conventional technique, since the wear of the tool increases considerably with the increase in the hardness of the roughly shaped material, the increase in the carbon content of the roughly shaped material was impossible practically. On the other hand, in the present invention, since the increase in the wear of the tool is suppressed by adding excessive Al against the increase in the hardness of a roughly shaped material, the industrial production becomes possible even if the carbon content of the steel for induction hardening is increased compared with the conventional technique. In addition, Al has the same effect as Si for the tempering behavior of the martensite steel tempered at a lower temperature, and is effective in improving the tooth surface fatigue strength by increasing considerably the resistance to temper softening. To obtain the effect, the Al content of 0.050% or more needs to be added to the steel for the induction hardening of the present invention. On the other hand, Al stabilizes the ferrite, when Al of more than 3.00% is added, the ferrite remains at the induction hardening and the uniform austenite is not obtain. As a result, the uniform austenite is not obtained after the hardening. Therefore the Al content needs to be in the range of more than 0.050% to 3.00%. The preferable range for the Al content is 0.100% to 1.00%.

P: 0.050% or less

Phosphorus (P) is an unavoidable impurity, is segregated at the austenite grain boundary, and embrittles the prior austenite grain boundary, thereby resulting in an intergranular cracking. Accordingly, it is preferable to decrease the P content as possible. Consequently, in the present invention, the P content of the steel for the induction hardening needs to be in a range of 0.050% or less. Although it is not necessary to determine a lower limit of the P content for the present invention, an excessive cost is required in order to limit the P content to 0.001% or less. Therefore, the preferable range for the P content is 0.001% to 0.015%.

N: 0.0200% or less

Nitrogen (N) forms AlN by bonding to Al in the steel. AlN functions to suppress the grain growth by pinning the austenite grain boundary, thereby preventing the structure from coarsening. In general, since a heating time of the induction heating is very short, grains are hard to coarsen even if AlN is not utilized actively. However, N may be added intentionally in order to refine the structure actively. On the other hand, if N is excessively added, ductility in a high temperature region of 1000° C. or higher deteriorates, which causes the decrease in yield of continuous casting and rolling. Therefore, in the present invention, the N content of the steel for the induction hardening needs to be limited to 0.0200% or less. The preferable range for the N content is 0.0050% to 0.0120%.

O: 0.0030% or less

Oxygen (O) forms oxide inclusions. If the O content is excessive, coarse inclusions which act as the origin of the fatigue fracture increase, which causes the deterioration of fatigue properties. Accordingly, it is preferable to decrease the O content as possible. Therefore, in the present invention, the O content of the steel for the induction hardening needs to be limited to 0.0030% or less. Although it is not necessary to determine a lower limit of the O content for the present invention, the excessive cost is required in order to limit the O content to 0.0001% or less. Therefore, the preferable range for the O content is 0.0001% to 0.0015%.

B: 0.0005 to 0.0050%

Boron (B) is a selective element which can be added as necessary to the steel for the induction hardening of the present invention. Since B which is dissolved in the austenite as the solid solution has the effect of greatly improving the hardenability of the steel even in a small amount, B is the element which is effective in obtaining the martensite structure during the carburizing quenching. To obtain the effect, the B content of 0.0005% or more may be added to the steel for the induction hardening of the present invention. On the other hand, when the B content of more than 0.0050% is added, the effect is saturated. Therefore, when B is added, the B content may be in the range of 0.0005 to 0.0050%. The preferable range for the B content may be 0.0010 to 0.0025%. If N of a certain amount or more exists in the steel, B bonds to N and forms BN. As a result, the effect of improving the hardenability cannot be obtained in some cases, because the amount of solid soluted B is reduced. When B is added, it is preferable to simultaneously add a suitable amount of Ti and Al for fixing N.

Cr: 0.05% to less than 0.30%

Chromium (Cr) is the selective element which can be added as necessary to the steel for the induction hardening of the present invention. Since Cr has an effect of refining considerably the lamellar spacing in pearlitic transformation, the hardness of the roughly shaped material increases considerably and the workability deteriorates. In addition, Cr stabilizes the θ carbide by concentrating in the θ carbide, so that it is suppressed that the carbides dissolve into the austenite during the induction hardening, which causes the hardness unevenness of the hardening layer. Therefore, when Cr is added, the Cr content may be limited to less than 0.30%. On the other hand, the 0 carbide may be transformed to the graphite in case that Si and Al content are excessive and the annealing time is long, so that the induction-hardenability may deteriorate. In order to prevent the situation, a small amount of Cr may be added to the steel for the induction hardening of the present invention. A lower limit of Cr in order to prevent the transformation to the graphite is 0.05%. Therefore, when Cr is added, the Cr content may be in the range of 0.05% to less than 0.30%. The preferable range for the Cr content may be 0.10 to 0.20%.

Mo: 0.01 to 1.00%

Molybdenum (Mo) is the selective element which can be added as necessary to the steel for the induction hardening of the present invention. Since Mo has the effect of improving the hardenability of the steel, Mo is the element which is effective in obtaining the martensite structure during the carburizing quenching. To obtain the effect, the Mo content of 0.01% or more may be added. On the other hand, when the Mo content of more than 1.00% is added, the cost for addition rises, and the workability in performing the process such as cutting, forging, and the like of the parts deteriorates considerably because the hardness of the roughly shaped material increases, which is not suitable for industrial production.

Therefore, when Mo is added, the Mo content may be in the range of 0.01 to 1.00%. The preferable range for the Mo content may be 0.10 to 0.60%. In addition, in order to improve the hardenability as much as possible without deteriorating the workability in performing the cutting and the forging, it is preferable to add a small amount of Mo. Namely, when the range of the Mo content is 0.10 to 0.50%, the deterioration of the workability caused by the increase in the hardness of the roughly shaped material becomes small and negligible substantially, and obvious improvement effect of the hardenability is also obtained. The reason is that Mo is the element which has the relatively large effect to improve the hardenability even in a small addition. Especially, when multiple additions with B are performed, a large effect of the multiple addition for the improvement of the hardenability is obtained even in the small addition.

Cu: 0.05 to 1.00%

Copper (Cu) is the selective element which can be added as necessary to the steel for the induction hardening of the present invention. Since Cu has the effect of improving the hardenability of the steel, Cu is effective in obtaining the martensite structure during the carburizing quenching. To obtain the effect, the Cu content of 0.05% or more may be added. However, when the Cu content of more than 1.00% is added, ductility in a high temperature region of 1000° C. or higher deteriorates, which causes the decrease in yield of the continuous casting and the rolling. Therefore, when Cu is added, the Cu content may be in the range of 0.05 to 1.00%. The preferable range for the Cu content may be 0.010 to 0.50%. In addition, in order to improve the ductility of the high temperature range, it is preferable to add simultaneously Ni whose addition is a half or more of the Cu addition when Cu is added.

Ni: 0.05 to 2.00%

Nickel (Ni) is the selective element which can be added as necessary to the steel for the induction hardening of the present invention. Since Ni has the effect of improving the hardenability of the steel, Ni is the element which is effective in obtaining the martensite structure during the carburizing quenching. To obtain the effect, the Ni content of 0.05% or more may be added. On the other hand, when the Ni content of more than 2.00% is added, the cost for the addition rises, which is not suitable for the industrial production. Therefore, when Ni is added, the Ni content may be in the range of 0.05 to 2.00%. The preferable range for the Ni content may be 0.40 to 1.60%.

V: 0.005 to less than 0.20%

Vanadium (V) is the selective element which can be added as necessary to the steel for the induction hardening of the present invention. V forms V(C, N) by bonding to N and C in the steel. V(C, N) functions to suppress the grain growth by pinning the austenite grain boundary, thereby preventing the structure from coarsening. To obtain the effect, the V content of 0.005% or more may be added. On the other hand, when the V content of 0.20% or more is added, the hardness of the roughly shaped material increases, so that the workability in performing the process such as the cutting, the forging, and the like of the parts deteriorates considerably. In addition, formation of V(C, N) becomes excessive, which causes the hardness unevenness of the hardening layer in the induction hardening. Therefore, when V is added, the V content may be in the range of 0.005 to less than 0.20%. The preferable range for the V content may be 0.05 to 0.10%.

Nb: 0.005 to 0.10%

Niobium (Nb) is the selective element which can be added as necessary to the steel for the induction hardening of the present invention. Nb forms Nb(C, N) by bonding to N and C in the steel. Nb(C, N) functions to suppress the grain growth by pinning the austenite grain boundary, thereby preventing the structure from coarsening. To obtain the effect, the Nb content of 0.005% or more may be added. On the other hand, when the Nb content of more than 0.10% is added, the hardness of the roughly shaped material increases, so that the workability in performing the process such as the cutting, the forging, and the like of the parts deteriorates considerably. In addition, formation of Nb(C, N) becomes excessive, which causes the hardness unevenness of the hardening layer in the induction hardening. Therefore, when Nb is added, the Nb content may be in the range of 0.005 to 0.10%. The preferable range for the Nb content may be 0.010 to 0.050%.

Ti: 0.005 to 0.10%

Titanium (Ti) is the selective element which can be added as necessary to the steel for the induction hardening of the present invention. Ti forms Ti(C, N) by bonding to N and C in the steel. Ti(C, N) functions to suppress the grain growth by pinning the austenite grain boundary, thereby preventing the structure from coarsening. To obtain the effect, the Ti content of 0.005% or more may be added. On the other hand, when the Ti content of more than 0.10% is added, the hardness of the roughly shaped material increases, so that the workability in performing the process such as the cutting, the forging, and the like of the parts deteriorates considerably. In addition, formation of Ti(C, N) becomes excessive, which causes the hardness unevenness of the hardening layer in the induction hardening. Therefore, when Ti is added, the Ti content may be in the range of 0.005 to 0.50%. The preferable range for the Ti content may be 0.015 to 0.050%.

Ca, Zr, Mg: 0.0005 to 0.0030%

Calcium (Ca), Magnesium (Mg), and Zirconium (Zr) are the selective element which can be added as necessary to the steel for the induction hardening of the present invention. Ca, Mg, and Zr respectively have functions to control the shape of MnS and to improve the machinability of the steel by forming a protective coat for the surface of the cutting tool during the cutting. To obtain the effect, at least one of Ca, Mg, and Zr of 0.0005% or more may be added. On the other hand, when the addition is more than 0.0030%, coarse oxides and sulfides may be formed, so that the fatigue strength of the part may be negatively influenced in some cases. Therefore, when Ca, Mg, or Zr is added, the Ca, Mg, or Zr content may be in the range of 0.0005 to 0.0030%. The preferable range for the Ca, Mg, and Zr content may be 0.0008 to 0.0020%.

In the present invention, Lead (Pb), Tellurium (Te), Zinc (Zn), Tin (Sn), and the like can be added in a range that does not diminish the effects of the present invention, in addition to the above elements. Pb, Te, Zn, and Sn are the selective element which can be added as necessary to the steel for the induction hardening of the present invention. In order not to diminish the effect of the present invention, an upper limit of an amount of these elements may be Pb: 0.50% or less, Te: 0.0030% or less, Zn: 0.50% or less, and Sn: 0.50% or less, respectively.

$$Al-(27/14)\times N>0.050\%$$

As mentioned above, Al has the effect of improving considerably the tool life in the cutting of the roughly shaped material in case that Al exists as a solid solution in the steel, so that the addition of Al is in the range of more than 0.050% to 3.00%. On the other hand, since Al may form AlN by bonding to N in the steel, Al may take morphology of the precipitates. However, Al which exists as the precipitates is not effective in improving the tool life. Especially, like the present invention, when performing slow cooling after hot forging or performing the annealing before the cutting, AlN precipitates easily compared with the process which performs air cooling after the hot forging. Therefore, in order to secure the solid soluted Al sufficiently, it is necessary to add Al more excessively than the predictive quantity to form AlN, so that it is needed to provide the relational expression between Al and N. Namely, when the value of "Al−(27/14)×N" which is an equation of the parameter of the solid soluted Al quantity is more than 0.050%, the improvement effect of the tool life can be obtained certainly. In regard to the steel for the induction hardening of the present invention, a theoretical upper limit of "Al−(27/14)×N" is 3.00%, and a preferable range is 0.100 to 1.00%.

In the roughly shaped material for the induction hardening according to an aspect of the present invention, coexistence between the tooth surface fatigue strength and the workability is attained sufficiently by controlling the steel composition and annealing conditions. Moreover, the formation of the coarse graphite grains is to be suppressed, and the number of the graphite grains with an average grain size of 0.5 μm or more is to be 40 pieces/mm$^2$ or less. When the amount of the graphite grains in the roughly shaped material is in the range, since the hardness of the hardening layer becomes even after performing the induction hardening to the roughly shaped material, it is possible to suppress the formation of the voids which are derived from the graphite grains. If the annealing with the suitable conditions is performed when producing the roughly shaped material by using the steel for the induction hardening of the present invention, it is possible that the number of the graphite grains with the average grain size of 0.5 μm or more is to be 0 pieces/mm$^2$. In other words, since the graphite may form in some steel compositions when performing excessive slow cooling after casting or performing the annealing for 300 min or more in a temperature range of 600° C. to 720° C. as annealing temperature, the formation of the graphite can be suppressed by avoiding the annealing for excessive long time in the above temperature range.

When performing the annealing at high temperature and for long time, it is preferable that graphitization value CE, which is defined as the following equation (1), is controlled to 1.8 or less by controlling the compositions of the steel for the induction hardening. Especially when performing the annealing at high temperature, it is more preferable that the CE is controlled to 1.28 or less.

$$CE=C+Si/3-Mn/12+Al/6+Cu/9+Ni/9-Cr/9-Mo/9+B \quad (1)$$

where the C, Si, Mn, Al, Cu, Ni, Cr, Mo, and B in the equation (1) indicate mass % of each element which is included in the steel for the induction hardening.

In a producing method of the roughly shaped material for the induction hardening according to an aspect of the present invention, processes of warm working or hot working, cooling, and annealing are performed in order, by using the steel for the induction hardening which has the above-mentioned composition. The annealing is performed by a condition of an annealing temperature of 680 to 800° C. and an annealing time of 10 to 360 minutes. The reason for using the conditions is explained below.

An instance of the warm working is warm forging, and an instance of the hot working is hot forging or hot rolling. When producing the roughly shaped material by performing the warm working or the hot working to comparative low carbon steels according to the conventional technique, the structure of the roughly shaped material becomes mainly (95% or more) the ferrite or the pearlite. In this case, the hardness of the roughly shaped material is greatly affected by the amount of a soft ferrite or the hardness of the ferrite itself. In order to soften the roughly shaped material, there are a method of increasing the fraction of the ferrite by combining the working and heat treating, a method of suppressing the addition of the element which has an effect of solute strengthening to the ferrite, and the like.

On the other hand, in the steel for the induction hardening of the present invention, the carbon content exceeds 0.75%. For this reason, even if the roughly shaped material is produced by any of the warm forging, the hot forging, or the hot rolling by using the steel, the structure of the roughly shaped material becomes the structure in which large fraction is the pearlite and small fraction is the ferrite, or the structure in which whole (95% or more) is substantially the pearlite. Therefore, the strength of the pearlite structure has dominant influence on the strength of the roughly shaped material. The strength of the pearlite structure is related to the lamellar spacing of the pearlite. In order to soften the steel which includes mainly the pearlite, it is exceedingly effective to obtain the structure in which the θ carbides disperse roughly, by changing the morphology of fine pearlite lamellar through the annealing. Namely, the effect of softening by the annealing in the case of the pearlite structure of the high carbon steel is larger than that in the case of the ferrite and pearlite structure of the low and medium carbon steel. In addition, when the heating temperature of the annealing is low, sufficient softening effect is not obtained because the ferrite and pearlite structure hardly change. Thus, it is necessary to perform the annealing at the temperature of 680° C. or more. In general, with an increase in the heating temperature, the fine pearlite lamellar is transformed and the θ carbides disperse roughly. However, when the annealing temperature is more than 800° C., the formation of the austenite increases and the austenite is transformed to the pearlite with the fine lamellar again during the cooling from the annealing temperature, so that the softening effect is not obtained. Therefore, the annealing temperature needs to be in the range of 680 to 800° C. The preferable range for the annealing temperature is 700 to 770° C. When the annealing time is short, since the morphology of the pearlite lamellar hardly changes, the sufficient softening effect is not obtained. Therefore the heating of the annealing needs to be 10 minutes or more. On the other hand, when the heating of the annealing is more than 360 minutes, the productivity decreases, which is not suitable for industrial production. Therefore, the heating time needs to be in the range of 10 to 360 minutes. The preferable range for the heating time is 30 to 300 minutes. In addition, although the cooling condition after the annealing is not provided in particular, it is preferable to perform the slow cooling as necessary, because the steel further softens by the cooling with small cooling rate (the slow cooling). The preferable range for an average cooling rate in a temperature range of 750 to 650° C. during the cooling is 300° C./hour or less.

In a producing method of the roughly shaped material for the induction hardening according to another aspect of the present invention, processes of hot working and cooling are performed in order, by using the steel for the induction hardening which has the above-mentioned composition. In the cooling process which follows the hot working process, an average cooling rate in a temperature range of 750 to 650° C. is 300° C./hour or less. In this aspect, an annealing does not necessarily perform. The reason for using this cooling condition is explained below.

As mentioned above, the strength of the pearlite structure has dominant influence (the pearlite lamellar spacing) on the hardness of the roughly shaped material, so that the annealing is exceedingly effective in softening. However, in order to improve the cost and the productivity for producing the parts, it is advantageous to omit the annealing. For this reason, the cooling rate which follows the hot working such as the hot forging or the hot rolling is controlled, the slow cooling is conducted in a temperature range of the pearlitic transformation, and the pearlite lamellar spacing is broadened by the pearlitic transformation at high temperature. As a result, the structure of the steel can be softened. In addition, since the steel stays continuously in the high temperature range after completion of the pearlitic transformation by performing the slow cooling, the same effect as the annealing can also be obtained. When the temperature range for the slow cooling is more than 750° C., the softening effect is not obtained, because the slow cooling is conducted in a temperature range where the pearlitic transformation cannot occur. On the other hand, when the temperature range for the slow cooling is less than 650° C., the pearlitic transformation begins at low temperature. Thus, broadening of the pearlite lamellar spacing becomes insufficient, softening also becomes insufficient, and moreover the annealing effect after the pearlitic transformation by the slow cooling decreases. Therefore, the temperature range for the slow cooling needs to be in the range of 750 to 650° C. The preferable range for the temperature range for the slow cooling is 740 to 680° C. In addition, when the average cooling rate is more than 300° C./hour, since the time for the stay in the high temperature range just after the completion of the pearlitic transformation is insufficient, the annealing effect decreases. Therefore, the average cooling rate in the temperature range for the slow cooling needs to be 300° C./hour or less. The preferable range for the average cooling rate in the temperature range for the slow cooling is 200° C./hour or less. The cooling rate as limited above is the average cooling rate from 750° C. to 650° C. and continuous cooling is not necessarily required, so that the cooling may have a holding period at a constant temperature in the cooling process as long as the above conditions are satisfied. In order to secure the productivity, it is preferable that a lower limit of the average cooling rate is 80° C./hour or more.

When performing the slow cooling as mentioned above, it is not necessary to perform the annealing after the cooling. However, it may be possible to combine the slow cooling with the annealing of the above mentioned conditions. In this case, large softening effect is obtained as compared with performing independently the slow cooling and the annealing.

An induction hardening steel part according to an aspect of the present invention is produced by performing the cutting and/or the cold working and the induction hardening, and performing furthermore low temperature tempering as necessary, by using the roughly shaped material for the induction hardening which is produced by any of the above mentioned producing method. The steel part is produced in order that a hardness of a hardened surface layer at a depth of 50 μm from a topmost surface of the induction hardening steel part is HV 650 or more and a hardness of a non-induction hardening area is HV 180 or more. The reason for the limitations is explained below. Instances of the steel part are the most power transmission parts and the like (for example, gears, bearings, CVT sheaves, and shafts) used for automobiles, construction machines, farm machines, electricity generating-wind turbines, other industrial machines and the like.

In order to obtain the fatigue properties and wear properties, surface hardening is performed to the parts such as the CVT sheaves, bearings, and the like. In the steel part according to the present invention, the induction hardening treatment corresponds to the surface hardening. In order to secure the fatigue properties and the wear properties which are equal to those of the carburized parts by this treatment, it is necessary to increase the surface hardness to the hardness which is equal to that of the carburized parts. The hardness at the depth of 50 μm from the topmost surface was selected as a representative value of the surface hardness. When the hardness at the position is HV 650 or more, it can be judged as the hardness which is equal to that of the general carburized parts. In this case, the fatigue properties and the wear properties which are equal to those of the carburized parts are obtained. A preferable upper limit of the hardness of the induction hardening area of the part which is produced by the steel composition and the producing method according to the present invention is HV 950 level. The preferable range for the hardness of the above area is HV 700 or more.

The details of processing conditions of the induction hardening (electromagnetic induction hardening) change with shape of the part and the like, and general techniques which are publicly known can be utilized. As an instance of the induction hardening which fits the present invention, the following condition can be used: for example, the quenching by the electromagnetic induction is performed on the frequency of 10 to 500 kHz and the processing time of 0.1 to 20 seconds by using a ring coil; subsequently the quenching by water cooling is performed; and a hardening depth becomes 0.2 to 2.5 mm. When performing the heating by the electromagnetic induction, the processed parts may be rotated at 100 to 2000 rpm in order to homogenize the depth of the hardening layer and to perform contour hardening of the gears. Moreover, in order to perform the rapid and short time heating, preheating may be conducted to a temperature range of Al point or less by low frequency electromagnetic induction beforehand.

Depending on the processing conditions, the hardening by the induction hardening can reaches from the surface of the induction hardening steel part to a depth range of 0.1 mm to 3 mm approximately, and the meaningful hardening does not occur at the depth more than above, that is inside of the steel (core area). The non-hardening area as mentioned above is referred to as the non-induction hardening area. Therefore, the hardness of the non-induction hardening area is substantially equal to the hardness of the roughly shaped material before the induction hardening. Since the hardness of the non-induction hardening area is related to the fatigue strength of an interior origin and the low cycle fatigue strength of the gears, excessive low value is not suitable. On the other hand, since the strength of whole of the induction hardening steel part can be improved by controlling the depth of the induction hardening, the interior hardness may be low to a certain extent compared with that of the general carburized parts. Especially, in order to secure the low cycle fatigue strength, the hardness of the non-induction hardening area needs to be HV 180 or more is needed, and the preferable range is HV 200 or more. Since the roughly shaped material according to the present invention can maintain the sufficient workability by the effect of the solid soluted Al even if the hardness is high, it is possible to secure sufficiently the hardness of the non-induction hardening area. In order to secure the workability before the hardening, a preferable upper limit of the hardness of the non-induction hardening area of the steel part according to the present invention is HV 240.

Shot peening may be performed after the induction hardening or after the induction hardening and the low temperature tempering (300° C. or less) to the induction hardening steel part according to the above aspect of the present invention. Since an increase in the compressive residual stress of the surface layer of the part, which is induced by the shot peening process, results in the suppression of initiation and propagation of fatigue crack, the tooth root and the tooth surface fatigue strength of the part which is produced by the steel of the present invention can be further improved. It is preferable that the shot peening process is conducted by the conditions which are that shot particles with a diameter of 0.7 mm or less are used and arc height is 0.4 mm or more.

EXAMPLE

Hereinafter, examples of the present invention will be described.

Molten steel made by a converter having the composition shown in Table 1 was subjected to a continuous casting, a soaking diffusion treatment as necessary, and then a blooming rolling, thereby a rolling material of 162 mm square was produced. Thereafter, the steel for the induction hardening whose shape is a bar with diameter of 45 mm was produced by the hot rolling.

Next, in order to simulate the gear-manufacturing process (thermal history), the hot working or the warm working were simulated under a condition shown in Table 2 for the hot rolled steel (the steel for the induction hardening). Heating temperature for hot working simulating was 1250° C., and heating temperature for warm working simulating was 750° C. After the hot or the warm working simulating, the annealing was conducted as necessary under a condition shown in Table 2. From samples of the roughly shaped material produced by the above processes, machinability evaluation specimens whose shape was a disc with 45 φ×15 mm and roller pitting test specimens which had a large diameter part (test part) of 26 φ were prepared.

Among the disc specimens of each test level, Vickers hardness at a position of ¼ of the diameter in a cross section along the diameter direction was measured for respective one speci-

TABLE 1

| steel | chemical composition (mass %) | | | | | | | | | | | |
|---|---|---|---|---|---|---|---|---|---|---|---|---|
| No. | C | Si | Mn | P | S | Cr | Mo | Ni | Cu | V | Ti | Nb |
| A | 0.80 | 0.25 | 0.40 | 0.009 | 0.016 | 0.11 | 0.04 | — | — | — | — | — |
| B | 0.80 | 1.00 | 0.40 | 0.005 | 0.015 | — | — | — | — | — | — | — |
| C | 0.80 | 1.00 | 0.40 | 0.010 | 0.015 | 0.10 | — | — | — | — | — | — |
| D | 0.80 | 1.02 | 0.40 | 0.011 | 0.002 | 0.09 | — | — | — | — | — | — |
| E | 0.76 | 0.20 | 0.25 | 0.013 | 0.047 | — | 1.00 | — | — | — | — | — |
| F | 1.20 | 0.05 | 0.40 | 0.010 | 0.015 | — | — | — | — | — | 0.005 | — |
| G | 0.76 | 0.002 | 2.00 | 0.010 | 0.019 | 0.05 | — | — | — | — | — | — |
| H | 0.76 | 3.00 | 0.38 | 0.023 | 0.052 | 0.20 | — | — | — | 0.005 | — | — |
| I | 0.77 | 0.30 | 0.22 | 0.010 | 0.015 | — | — | 2.00 | 1.00 | — | — | 0.018 |
| J | 0.80 | 0.25 | 0.60 | 0.010 | 0.007 | 0.30 | — | — | — | — | 0.100 | — |
| K | 0.80 | 0.29 | 0.39 | 0.012 | 0.015 | 0.10 | 0.11 | — | — | 0.19 | — | — |
| L | 0.80 | 0.35 | 0.80 | 0.002 | 0.015 | 0.12 | — | 0.08 | — | — | — | 0.100 |
| M | 0.80 | 0.24 | 0.40 | 0.010 | 0.015 | 0.11 | — | 0.05 | 0.05 | — | 0.035 | — |
| N | 0.53 | 0.25 | 0.76 | 0.015 | 0.019 | 0.10 | — | — | — | — | — | — |
| O | 0.60 | 1.63 | 0.41 | 0.016 | 0.016 | 0.15 | — | — | — | — | — | — |
| P | 0.80 | 0.25 | 0.34 | 0.010 | 0.015 | 0.50 | — | — | — | — | — | — |
| Q | 0.80 | 0.25 | 0.40 | 0.010 | 0.015 | — | — | — | — | 0.33 | — | — |
| R | 0.80 | 0.26 | 0.43 | 0.011 | 0.013 | 0.11 | — | — | — | — | — | — |
| S | 0.80 | 0.20 | 0.40 | 0.005 | 0.023 | 0.08 | — | — | — | — | — | — |
| T | 0.76 | 0.25 | 0.48 | 0.015 | 0.018 | — | — | — | — | — | — | — |
| U | 1.31 | 0.25 | 0.41 | 0.010 | 0.025 | 0.10 | — | — | — | — | — | — |
| V | 1.03 | 2.78 | 0.21 | 0.046 | 0.013 | — | — | — | — | — | — | — |

| steel | chemical composition (mass %) | | | | | | | |
|---|---|---|---|---|---|---|---|---|
| No. | Al | B | Ca, Zr, Mg | N | O | CE | Al − (27/14) × N | note |
| A | 0.104 | 0.0020 | — | 0.0085 | 0.0016 | 0.85 | 0.088 | example |
| B | 0.131 | — | — | 0.0074 | 0.0018 | 1.12 | 0.117 | |
| C | 1.000 | — | — | 0.0045 | 0.0008 | 1.26 | 0.991 | |
| D | 1.400 | — | — | 0.0040 | 0.0010 | 1.33 | 1.392 | |
| E | 0.111 | — | — | 0.0075 | 0.0011 | 0.71 | 0.097 | |
| F | 0.108 | — | Mg: 0.0010 | 0.0081 | 0.0030 | 1.20 | 0.092 | |
| G | 3.000 | — | — | 0.0035 | 0.0022 | 1.09 | 2.993 | |
| H | 0.110 | — | Zr: 0.0012 | 0.0083 | 0.0001 | 1.72 | 0.094 | |
| I | 0.120 | — | — | 0.0156 | 0.0015 | 1.21 | 0.090 | |
| J | 0.051 | — | — | 0.0004 | 6.0023 | 0.81 | 0.050 | |
| K | 0.121 | — | — | 0.0081 | 0.0019 | 0.86 | 0.105 | |
| L | 0.101 | — | Ca: 0.0010 | 0.0019 | 0.0026 | 0.86 | 0.097 | |
| M | 0.110 | 0.0015 | — | 0.0033 | 0.0010 | 0.87 | 0.104 | |
| N | 0.035 | — | — | 0.0056 | 0.0016 | 0.55 | 0.024 | comparative example |
| O | 0.131 | — | — | 0.0052 | 0.0013 | 1.11 | 0.121 | |
| P | 0.147 | — | — | 0.0031 | 0.0018 | 0.82 | 0.141 | |
| Q | 0.122 | — | — | 0.0062 | 0.0008 | 0.87 | 0.110 | |
| R | 0.031 | — | — | 0.0060 | 0.0011 | 0.84 | 0.019 | |
| S | 0.025 | — | — | 0.0050 | 0.0010 | 0.83 | 0.015 | |
| T | 0.021 | — | Ca: 0.0011 | 0.0032 | 0.0008 | 0.81 | 0.015 | |
| U | 0.275 | — | Ca: 0.0012 | 0.0048 | 0.0021 | 1.39 | 0.266 | |
| V | 0.087 | — | — | 0.0145 | 0.0015 | 1.95 | 0.059 | |

In Table 1, "-" of each element means that the element was not added. The underlined value of comparative example means out of the range of the present invention.

men. When the hardness of the roughly shaped material was more than HV 240, it was judged as unsatisfied workability (cold forgeability or machinability).

TABLE 2

| production No. | steel No. | working process | cooling rate after hot working or warm working °C./h | annealing condition | hardness of base steel HV | number of graphite grains with average grain size of 0.5 μm or more pieces/mm² |
|---|---|---|---|---|---|---|
| 1 | A | hot working | uncontrolled (air cooling) | 720° C. × 300 min. | 190 | 0 |
| 2 | A | hot working | 130 | none | 205 | 0 |
| 3 | A | hot working | 200 | 720° C. × 300 min. | 180 | 0 |
| 4 | A | hot working | 300 | 720° C. × 30 min. | 190 | 0 |
| 5 | A | warm working | uncontrolled (air cooling) | 720° C. × 30 min. | 185 | 0 |
| 6 | B | hot working | uncontrolled (air cooling) | 740° C. × 300 min. | 200 | 0 |
| 7 | B | hot working | 130 | none | 215 | 0 |
| 8 | B | hot working | 200 | 740° C. × 300 min. | 190 | 0 |
| 9 | B | hot working | 300 | 740° C. × 30 min. | 200 | 0 |
| 10 | B | warm working | 300 | 740° C. × 300 min. | 190 | 0 |
| 11 | C | hot working | uncontrolled (air cooling) | 760° C. × 300 min. | 200 | 0 |
| 12 | C | hot working | 130 | none | 215 | 0 |
| 13 | C | hot working | 200 | 760° C. × 300 min. | 190 | 0 |
| 14 | C | hot working | 300 | 760° C. × 30 min. | 200 | 0 |
| 15 | C | warm working | uncontrolled (air cooling) | 760° C. × 300 min. | 185 | 0 |
| 16 | D | hot working | uncontrolled (air cooling) | 765° C. × 300 min. | 200 | 0 |
| 17 | E | hot working | 100 | 720° C. × 300 min. | 220 | 0 |
| 18 | F | hot working | 100 | 720° C. × 360 min. | 230 | 5 |
| 19 | G | hot working | uncontrolled (air cooling) | 800° C. × 300 min. | 180 | 0 |
| 20 | H | hot working | uncontrolled (air cooling) | 780° C. × 360 min. | 200 | 13 |
| 21 | I | hot working | 100 | 720° C. × 300 min. | 220 | 0 |
| 22 | J | hot working | uncontrolled (air cooling) | 680° C. × 300 min. | 225 | 0 |
| 23 | K | hot working | uncontrolled (air cooling) | 720° C. × 300 min. | 240 | 0 |
| 24 | L | hot working | uncontrolled (air cooling) | 720° C. × 300 min. | 220 | 0 |
| 25 | M | hot working | uncontrolled (air cooling) | 720° C. × 300 min. | 190 | 0 |
| 26 | A | hot working | uncontrolled (air cooling) | none | 300 | 0 |
| 27 | A | hot working | uncontrolled (air cooling) | 650° C. × 300 min. | 270 | 0 |
| 28 | A | hot working | uncontrolled (air cooling) | 820° C. × 300 min. | 290 | 0 |
| 29 | A | hot working | 350 | 660° C. × 300 min. | 260 | 0 |
| 30 | N | hot working | uncontrolled (air cooling) | 720° C. × 300 min. | 145 | 0 |
| 31 | O | hot working | uncontrolled (air cooling) | 720° C. × 300 min. | 160 | 0 |
| 32 | P | hot working | uncontrolled (air cooling) | 720° C. × 300 min. | 240 | 0 |
| 33 | Q | hot working | uncontrolled (air cooling) | 720° C. × 300 min. | 250 | 0 |
| 34 | R | hot working | uncontrolled (air cooling) | 720° C. × 300 min. | 190 | 0 |
| 35 | S | hot working | 100 | 720° C. × 300 min. | 180 | 0 |
| 38 | T | hot working | 100 | 720° C. × 300 min. | 175 | 0 |
| 37 | U | hot working | uncontrolled (air cooling) | 720° C. × 300 min. | 270 | 0 |
| 38 | V | hot working | uncontrolled (air cooling) | none | 235 | 442 |
| 39 | A | hot working | uncontrolled (air cooling) | 720° C. × 600 min. | 145 | 155 |

| production No. | tool life in cutting of base steel m/min | hardness of hardening layer HV | 300° C. tempered hardness of hardening layer HV | hardness of non-induction hardening area HV | roller pitting fatigue strength MPa | note |
|---|---|---|---|---|---|---|
| 1 | 125 | 790 | 690 | 190 | 3400 | example |
| 2 | 110 | 780 | 690 | 205 | 3400 | |
| 3 | 135 | 775 | 690 | 180 | 3400 | |
| 4 | 125 | 775 | 690 | 190 | 3400 | |
| 5 | 120 | 785 | 690 | 185 | 3400 | |
| 6 | 110 | 810 | 710 | 200 | 3700 | |
| 7 | 115 | 800 | 710 | 215 | 3700 | |
| 8 | 125 | 795 | 710 | 190 | 3700 | |
| 9 | 110 | 800 | 710 | 200 | 3700 | |
| 10 | 125 | 805 | 710 | 190 | 3700 | |
| 11 | 110 | 805 | 720 | 200 | 3900 | |
| 12 | 115 | 815 | 720 | 215 | 3900 | |
| 13 | 125 | 815 | 720 | 190 | 3900 | |
| 14 | 110 | 810 | 720 | 200 | 3900 | |
| 15 | 120 | 815 | 720 | 185 | 3900 | |
| 16 | 110 | 820 | 725 | 200 | 4000 | |
| 17 | 95 | 800 | 700 | 220 | 3600 | |
| 18 | 80 | 845 | 750 | 230 | 4300 | |
| 19 | 130 | 795 | 705 | 180 | 3600 | |
| 20 | 110 | 825 | 730 | 200 | 4000 | |
| 21 | 90 | 785 | 685 | 220 | 3300 | |
| 22 | 80 | 785 | 895 | 225 | 3500 | |
| 23 | 70 | 775 | 895 | 240 | 3500 | |
| 24 | 90 | 785 | 695 | 220 | 3500 | |
| 25 | 120 | 775 | 695 | 190 | 3500 | |
| 26 | 5 | 790 | 690 | 300 | 3400 | comparative example |
| 27 | 40 | 790 | 690 | 270 | 3400 | |
| 28 | 25 | 790 | 690 | 290 | 3400 | |
| 29 | 35 | 790 | 690 | 260 | 3400 | |

TABLE 2-continued

| | | | | | |
|---|---|---|---|---|---|
| 30 | 135 | <u>645</u> | <u>610</u> | 145 | 2200 |
| 31 | 130 | 675 | 620 | <u>160</u> | <u>2400</u> |
| 32 | 60 | 690 | 600 | 240 | 2100 |
| 33 | 50 | 715 | 620 | 250 | 2300 |
| 34 | 55 | 785 | 695 | 190 | 3500 |
| 35 | 60 | 775 | 690 | 180 | 3400 |
| 38 | 65 | 740 | 660 | 175 | 2700 |
| 37 | 40 | 750 | 720 | 270 | 3900 |
| 38 | 75 | <u>630</u> | 590 | 235 | 1900 |
| 39 | 110 | 620 | 580 | 145 | 1800 |

"Cooling rate after hot working or warm working" in Table 2 shows the average cooling rate in a temperature range of 750 to 650° C. The underline in steel No., cooling rate, annealing condition, hardness of hardening layer, and hardness of non-induction hardening area in Table 2 means out of the range of the present invention. The underline in hardness of base steel, tool life in cutting of base steel, 300° C. tempered hardness of hardening layer, and roller pitting fatigue strength means unsatisfied value.

The machinability evaluation test (measurement of the tool life) was conducted under a condition shown in Table 3 by using the above the disc specimens. The maximum cutting speed (m/min) which was obtained by drilling to the total depth of 1000 mm was used as the parameter of the tool life in the condition of the machinability evaluation test. When the parameter did not reach 70 m/min, it was judged as unsatisfied machinability.

TABLE 3

| cutting condition | drill |
|---|---|
| cutting speed 10~140 m/min<br>feed rate 0.25 mm/rev<br>water-soluble cutting oil was utilized. | φ3 mm<br>NACHI(trademark)heiss drill<br>(drill of type SD3.0 of nachi-fujikoshi corporation) |

The induction hardening was conducted under a condition such that the depth of the hardening layer became 2 mm at the large diameter part (test part), by using the above roller pitting test specimens. Subsequently, the tempering was conducted under a condition of 150° C.×90 minutes. Thereafter, in order to increase the accuracy of the fatigue test, grip section was subjected to a finish machining. The roller pitting test was performed under a condition of a big roller: SCM 420 carburized product-crowning 150R, frequency of rotation: 2000 rpm, lubricant oil: transmission oil, oil temperature of 80° C., slip ratio of 40%, and the maximum number of the test of ten million times, and the fatigue limit was determined by creating an S-N diagram, whereby the roller pitting fatigue strength was determined. When the roller pitting fatigue strength did not reach 2600 MPa, it was judged as unsatisfied tooth surface fatigue strength.

One specimen of each test level in the roller pitting test specimens which were subjected to the induction hardening and the tempering was cut at the large diameter part for respective production No., and the Vickers hardness at a position of 50 μm from the surface in the cross section was measured. The measurement result is used as the hardness of hardening layer. The tempering was further conducted under a condition of 300° C.×90 minutes by using another specimen for respective production No., the respective specimen was cut at the large diameter part, and the 300° C. tempered hardness was determined by measuring the Vickers hardness at the position of 50 μm from the surface in the cross section.

When the 300° C. tempered hardness did not reach HV 630, it was judged as unsatisfied tooth surface fatigue strength because the 300° C. tempered hardness is inferior.

The evaluated results were shown in Table 2. All of the examples of production No. 1 to 25 satisfied the target, and showed the excellent workability and the sufficient tooth surface fatigue strength. On the other hand, in production No. 26, although the steel composition was within the range of the present invention, since the slow cooling and the annealing after the hot working were not performing, the hardness of the roughly shaped material was high, so that the workability was inferior. Since the annealing temperature was excessively low in production No. 27 and the annealing temperature was excessively high in production No. 28, the hardness of the roughly shaped material was high, so that the workability was inferior. In production No. 29, since the cooling rate after the hot working was excessively fast and the annealing temperature was excessively low, the hardness of the roughly shaped material was high, so that the workability was inferior. In production No. 30 and 31, although the hardness of the roughly shaped material was low and the workability was excellent because the carbon content was low, the 300° C. tempered hardness was low and the roller pitching fatigue strength was also low. In production No. 32, since the Cr content was excessive, the softening effect by the slow cooling or the annealing was not obtained sufficiently, so that the workability was inferior. In addition, since it was not sufficient that the carbides dissolved into the austenite during the induction hardening, the hardness of the hardening layer was not obtained sufficiently, so that the 300° C. tempered hardness became low and the roller pitching fatigue strength was also low. In production No. 33, since the V content was excessive, the softening effect by the slow cooling or the annealing was not obtained sufficiently, so that the workability was inferior. In addition, since it was not sufficient that the carbides dissolved into the austenite during the induction hardening, the hardness of the hardening layer was not obtained sufficiently, so that the 300° C. tempered hardness became low and the roller pitching fatigue strength was also low. In production No. 34, 35, and 36, since the Al was insufficient, the improvement effect of the tool life by the solid soluted Al was not obtained, so that the tool life in the cutting was inferior even in low value of the hardness of the roughly shaped material. In production No. 37, since the carbon content was excessive, the softening to the target value was not obtained even if the slow cooling and an annealing were conducted, so that the workability was inferior. In production No. 38 which was steel No. V, although each of the steel composition was within the range of the present invention, the CE value was out of the preferable value of the present invention, so that the graphite of more than the range of the present invention precipitated in the roughly shaped material. Thereby, the hardness of the hardening layer after the induction hardening and the 300° C. hardness of the hardening layer were insufficient. In addition, in the hardening layer, the roller pitching fatigue strength was also low because the voids were formed at the position where the graphites existed. In production No. 39, although the steel composition was within the range of the present invention, since the annealing time for producing the roughly shaped material was excessively long, the graphite of more than the range of the present invention precipitated. Thereby, the hardness of the hardening layer after the induction hardening and the 300° C. hardness of the hardening layer were insufficient. Moreover, the hardness of the non-induction hardening area after the induction hardening was also necessarily low because the hardness of the roughly shaped material decreased by precipitation of the graphite, and the roller pitching fatigue strength was also low because the voids existed in the hardening layer.

INDUSTRIAL APPLICABILITY

The steel for the induction hardening, the roughly shaped material for the induction hardening, the producing method thereof, and the induction hardening steel part according to the above aspects of the present invention can apply to most power transmission parts (for example, gears, bearings, CVT sheaves, and shafts) used for automobiles, construction machines, farm machines, electricity generating-wind turbines, other industrial machines and the like. In addition, the coexistence between the workability during the production of the part and the fatigue strength of the steel part after the induction hardening can be achieved. Thus it is possible to substitute the induction hardening treatment for the carburizing treatment. Therefore the continuous surface hardening treatment becomes possible, the load on the environment can be reduced, and the part accuracy can be improved.

The invention claimed is:

1. A roughly shaped material for an induction hardening comprising, by mass %,
C: more than 0.75% to 1.20%,
Si: 0.002 to 3.00%,
Mn: 0.20 to 2.00%,
S: 0.002 to 0.100%,
Al: more than 0.050% to 3.00%,
P: limited to 0.050% or less,
N: limited to 0.0200% or less,
O: limited to 0.0030% or less,
at least one of
  V: 0.005 to less than 0.20%,
  Nb: 0.005 to 0.10%, and
  Ti: 0.005 to 0.10%, and
the balance of iron and unavoidable impurities,
wherein an Al content and a N content, by mass %, satisfy Al−(27/14)×N>0.050%, and wherein the roughly shaped material has a number of graphite grains with an average grain size of 0.5 μm or more, which is included in the roughly shaped material for induction hardening is 40 pieces/mm² or less.

2. The roughly shaped material for induction hardening according to claim 1, further comprising, by mass %,
B: 0.0005 to 0.0050%.

3. The roughly shaped material for induction hardening according to claim 1, further comprising at least one of, by mass %,
Cr: 0.05% to less than 0.30%,
Mo: 0.01 to 1.00%,
Cu: 0.05 to 1.00%, and
Ni: 0.05 to 2.00%.

4. The roughly shaped material for induction hardening according to claim 1, further comprising at least one of, by mass %,
Ca: 0.0005 to 0.0030%,
Zr: 0.0005 to 0.0030, and
Mg: 0.0005 to 0.0030%.

5. The roughly shaped material for induction hardening according to claim 2, further comprising at least one of, by mass %,
Cr: 0.05% to less than 0.30%,
Mo: 0.01 to 1.00%,
Cu: 0.05 to 1.00%, and
Ni: 0.05 to 2.00%.

6. The roughly shaped material for induction hardening according to claim 2, further comprising at least one of, by mass %,
Ca: 0.0005 to 0.0030%,
Zr: 0.0005 to 0.0030%, and
Mg: 0.0005 to 0.0030%.

7. The roughly shaped material for induction hardening according to claim 3, further comprising at least one of, by mass %,
Ca: 0.0005 to 0.0030%,
Zr: 0.0005 to 0.0030%, and
Mg: 0.0005 to 0.0030%.

8. The roughly shaped material for induction hardening according to claim 5, further comprising at least one of, by mass %,
Ca: 0.0005 to 0.0030%,
Zr: 0.0005 to 0.0030%, and
Mg: 0.0005 to 0.0030%.

9. A producing method of a roughly shaped material for induction hardening, the method comprising the following successive steps:
warm working or hot working, cooling, and annealing a steel for induction hardening having a chemical composition of the roughly shaped material for induction hardening according to any one of claims 1-3, 4, 5 and 6-8,
wherein the annealing is performed at an annealing temperature of 680 to 800° C. and an annealing time of 10 to 360 minutes, and wherein an average cooling rate in a temperature range of 750 to 650° C. during the cooling is 300° C./hour or less.

10. A producing method of a roughly shaped material for induction hardening, the method comprising the following successive steps:
hot working and cooling a steel for induction hardening having a chemical composition of the roughly shaped material for the induction hardening according to any one of claims 1-3, 4, 5 and 6-8,
wherein an average cooling rate in a temperature range of 750 to 650° C. during the cooling is 300° C./hour or less.

11. An induction hardening steel part which is produced using the roughly shape material according to any one of claims 1-3, 4, 5 and 6-8,
wherein a hardness of a hardened surface layer at a depth of 50 nm from a topmost surface of the induction hardening steel part is HV650 or more,
wherein a hardness of a non-induction hardening area is HV180 or more, and
wherein a number of graphite grains with an average grain size of 0.5 μm or more which exist in the non-induction hardening area is 40 pieces/mm² or less.

* * * * *

UNITED STATES PATENT AND TRADEMARK OFFICE
CERTIFICATE OF CORRECTION

| | |
|---|---|
| PATENT NO. | : 9,039,962 B2 |
| APPLICATION NO. | : 13/637414 |
| DATED | : May 26, 2015 |
| INVENTOR(S) | : Kubota et al. |

It is certified that error appears in the above-identified patent and that said Letters Patent is hereby corrected as shown below:

In the specification,

Column 10, line 45, change "the 0 carbide may be" to -- the θ carbide may be --;

Column 21, line 2, Table 2, line "Production No. 30", Column "tool life in cutting of base steel m/min", change "135" to -- 115 --;

Column 21, line 3, Table 2, line "Production No. 31", Column "tool life in cutting of base steel m/min", change "130" to -- 110 --;

In the claims,

Column 24, line 54, change "the roughly shape material" to -- the roughly shaped material --; and Column 24, line 57, change "50 nm from" to -- 50 μm from --.

Signed and Sealed this
Fifth Day of April, 2016

Michelle K. Lee
*Director of the United States Patent and Trademark Office*